United States Patent

[11] 3,624,090

[72] Inventors Duncan Clark
Norton-on-Tees;
Percy Hayden, Norton-on-Tees; Alan Bell,
Runcorn; John Edward Colchester,
Runcorn, all of England
[21] Appl. No. 817,251
[22] Filed Apr. 7, 1969
[45] Patented Nov. 30, 1971
[73] Assignee Imperial Chemical Industries Limited
London, England
[32] Priority Apr. 7, 1965
[33] Great Britain
[31] 14,778/65
Continuation of application Ser. No.
485,081, Sept. 3, 1965, now abandoned.
This application Apr. 7, 1969, Ser. No.
817,251

[54] PREPARATION OF PYRIDINE
10 Claims, No Drawings

[52] U.S. Cl. ................................................. 260/290
[51] Int. Cl. ............................................... C07d 31/08
[50] Field of Search ........................................ 260/209 P

[56] References Cited
UNITED STATES PATENTS

| | | | |
|---|---|---|---|
| 3,299,074 | 1/1967 | Campbell ..................... | 260/290 |
| 3,306,905 | 2/1967 | Hall ............................. | 260/290 |

*Primary Examiner*—Henry R. Jiles
*Assistant Examiner*—Cecilia M. Shurko
*Attorney*—Cushman, Darby & Cushman

ABSTRACT: There is provided a process for preparing pyridine wherein substituted or unsubstituted glutaraldehydes or precursors thereof are reacted in the liquid phase with ammonium ions in the presence of molecular oxygen and cupric ions and in a medium comprising an alkanoic acid. The alkanoic acid preferably has up to 6 carbon atoms in the alkyl group, such as acetic acid. The cupric ions may be supplied in the form of a salt such as cupric acetate. Conveniently, the reaction temperature is up to 150° C. and the partial pressure of oxygen is at least 0.5 atmospheres.

PREPARATION OF PYRIDINE

This application is a continuation of Ser. No. 485,081, filed Sept. 3, 1965 and now abandoned.

This invention relates to the manufacture of organic bases, and in particular to a process for the manufacture of pyridine or substituted pyridines by the interaction of glutaraldehyde, a substituted glutaraldehyde or a precursor thereof in the liquid phase with ammonium ions or ammonia in the presence of molecular oxygen.

By the term "percursor" is denoted a compound which, in the absence of ammonium ions, will give rise to a glutaraldehyde when subjected to the conditions of temperature and pH contemplated for use in the reaction. Such precursors may be, for example, the cyclic enol-acetals of the said aldehydes. The cyclic enol-acetals are alternatively described as ethers of 2-hydroxy-3,4-dihydro-2H-pyrans. In particular, the alkyl ethers (2-alkoxy-3,4-dihydro-2H-pyrans) may be used, for example the alkyl ethers containing up to six carbon atoms in the alkoxy group.

The use of molecular oxygen in the reaction of glutaraldehyde, a substituted glutaraldehyde or a precursor thereof in the liquid phase with ammonium ions or ammonia has been described. While it is advantageous to carry out the said reaction in the presence of molecular oxygen and also of ferric ions, it has now been found that it is especially advantageous to use molecular oxygen in the presence of cupric ions.

Thus according to the present invention there is provided a process for preparing pyridine or a substituted pyridine by reaction glutaraldehyde, a substituted glutaraldehyde or a precursor thereof in the liquid phase with ammonium ions or ammonia in the presence of molecular oxygen and also in the presence of cupric ions.

While the reaction between glutaraldehyde, a substituted glutaraldehyde or a precursor thereof with ammonium ions or ammonia may be carried out in reaction media comprising water and/or an organic solvent, mixtures of water with one or more organic components are especially suitable. A wide range of organic solvents may be used but it has now been found that it is advantageous to use an alkanoic acid containing up to 6 carbon atoms in the alkyl group, for example acetic acid or propionic acid. It is especially preferred to use aqueous acetic acid containing, for example, from 2 to 5 percent by weight of acetic acid.

It is preferred to carry out the reaction under conditions such that the ammonia is present predominantly as an ammonium salt rather than as free ammonia; the pH range from 1 to 7 is especially preferred.

Ammonium ions may be introduced as such or may be generated in situ. It is preferred to introduce ammonium ions in the form of an ammonium salt; suitable ammonium salts include the salts of aliphatic carboxylic acids, for example ammonium acetate, and the salts of mineral acids, for example ammonium sulfate and ammonium nitrate. Alternatively, gaseous ammonia or a solution of ammonia may be introduced into the reaction mixture. Amides hydrolysable to form ammonium ions, for example formamide or urea, may also be employed.

In a preferred embodiment of the invention, aqueous acetic acid is used as the reaction medium and ammonium acetate is the source of ammonium ions.

It is preferred to use at least one mole of ammonium ion or ammonia for each mole of glutaraldehyde, substituted glutaraldehyde or precursor thereof. The concentration of ammonium ions is preferably at least 0.01 molar, for example in the range 0.01 to 2.0 molar.

The reaction may be carried out over a wide range of temperature and pressure, depending partly upon the particular reactants and reaction medium. In general, it is preferred to use temperatures in the range from 15° to 150° C., especially in the range from 80° to 130° C.

Preferably, the reaction is carried out at a pressure in the range from 1 to 30 atmospheres, for example in the range from 1 to 20 atmospheres; higher pressures, for example up to 50 atmospheres, may also be employed.

The partial pressure of oxygen is preferably in the range from 0.1 to 20 atmospheres; it is especially preferred to use an oxygen-partial pressure of at least 0.5 atmospheres, for example about 1 atmosphere. The oxygen may be introduced as substantially pure oxygen or in the form of a mixture, for example a mixture of oxygen and nitrogen.

Cupric ions are preferably introduced as cupric salts but may be produced in situ by oxidation of cuprous salt. The ions may be derived from inorganic salts, for example cupric nitrate, or from organic salts; in particular salts of carboxylic acids may be used, for example cupric acetate. The preferred concentrations of cupric ions are those in the range from 0.001 molar to 1.00 molar.

The reaction may be carried out batchwise but it is an advantage of the process described herein that it lends itself to continuous operation.

In order to operate the process continuously it is highly desirable that the product should exist in the mixture in the form of a free base rather than as a salt and, to this end, the pH preferably lies within the range 4 to 7. The free pyridine or substituted pyridine may then be separated from the reaction mixture continuously, for example by azeotropic distillation or solvent extraction.

If it is desired to carry out the reaction batchwise it is practicable to operate in a pH range (for example from pH 1 to pH 4) in which the product is obtained initially as a salt of the base with an anion which is present in the mixture. The base may then be released by adjusting the pH, for example by adding an alkali, and the pyridine or substituted pyridine may then be separated by conventional methods.

The process is applicable, in particular, to the manufacture of pyridine itself and of alkylpyridines, for example methylpyridine. It will be apparent, however, that the process is applicable to the manufacture of a wide range of substituted pyridines.

The invention is illustrated but not limited by the following examples.

EXAMPLE 1

The process was carried out in a glass reactor fitted with a reflux condenser and with a hollow-shafted cruciform stirrer. Oxygen was introduced through the stirrer and subsequently withdrawn from the reactor and recycled, at a rate of 10 litres/hour.

The reaction mixture consisted of:

| | |
|---|---|
| cupric acetate | $10^{-2}$ moles |
| ammonium acetate | $20 \times 10^{-2}$ moles |
| glacial acetic acid | $6.6 \times 10^{-2}$ moles |
| 2-methoxy-3,4-dihydro-2H-pyran | $8.8 \times 10^{-2}$ moles |
| water | 100 ml. |

Oxygen was introduced over a period of 3 hours while the reaction mixture was maintained at 80° C. During this time a total of $5.7 \times 10^{-2}$ moles of oxygen were consumed.

The products comprised:

| | |
|---|---|
| pyridine | $6.5 \times 10^{-2}$ moles |
| methanol | $8.8 \times 10^{-2}$ moles |

The molar yield of pyridine, based on the pyran fed was 75 percent.

EXAMPLE 2

The reaction mixture consisted of:

| | |
|---|---|
| cupric acetate | $5 \times 10^{-2}$ moles |
| ammonium acetate | $20 \times 10^{-2}$ moles |
| glacial acetic acid | $6.6 \times 10^{-2}$ moles |
| water | 100 ml. |

Over a period of 5 hours, $8.8 \times 10^{-2}$ moles of 2-methoxy-3,4-dihydro-2-H-pryan were added to the mixture. Oxygen was introduced continuously, as described in example 1, for 6 hours while the reaction mixture was maintained at 80° C. The oxygen consumed during this time amounted to $6.0\times10^{-2}$ moles.

The products comprised:

| | |
|---|---|
| pyridine | $7.1\times10^{-2}$ moles |
| methanol | $8.8\times10^{-2}$ moles |

The molar yield of pyridine, based on the pyran fed, was 81 percent.

EXAMPLE 3

The reaction mixture consisted of:

| | |
|---|---|
| cupric acetate | $10^{-2}$ moles |
| ammonium acetate | $20\times10^{-2}$ moles |
| glacial acetic acid | $6.6\times10^{-1}$ moles |
| water | 100 ml. |

Over a period of 2 hours, $10.5\times10^{-2}$ moles of glutaraldehyde (in the form of a 25 percent solution in water) and also $10.5\times10^{-2}$ moles of ammonia (as ammonium hydroxide solution, specific gravity 0.88) were added. Oxygen was introduced continuously, as described in example 1, for 3 hours and the reaction temperature was maintained at 80° C. The oxygen consumed amounted to $6.7\times10^{-2}$ moles.

The products comprised:

| | |
|---|---|
| pyridine | $7.1\times10^{-2}$ moles |
| methanol | $10.5\times10^{-2}$ moles |

The molar yield of pyridine, based on the glutaraldehyde fed, was 68 percent.

EXAMPLE 4

The reaction mixture consisted of:

| | |
|---|---|
| cupric acetate | $5\times10^{-2}$ moles |
| ammonium acetate | $20\times10^{-2}$ moles |
| glacial acetic acid | $6.6\times10^{-1}$ moles |
| water | 100 ml. |

Over a period of 70 minutes, $1.5\times10^{-2}$ moles of glutaraldehyde were added. Oxygen was introduced continuously as described in example 1, for 100 minutes, while the reaction mixture was maintained at 80° C. The oxygen consumed amounted to $1.2\times10^{-2}$ moles.

The products comprised:

| | |
|---|---|
| pyridine | $1.3\times10^{-2}$ moles |
| methanol | $1.5\times10^{-2}$ moles |

The molar yield of pyridine, based on the glutaraldehyde fed, was 87 percent.

EXAMPLE 5

The reaction mixture consisted of:

| | |
|---|---|
| ferric acetate | $3.5\times10^{-2}$ moles |
| ammonium acetate | $2.3\times10^{-1}$ moles |
| glacial acetic acid | $66\times10^{-2}$ moles |
| water | 160 ml. |

Over a period of 3 hours, $5.0\times10^{-2}$ moles of 2-methoxy-3,4-dihydro-2H-pyran were added to the mixture while oxygen was introduced continuously, as described in example 1, and the reaction mixture was maintained at 80° C.

The molar yield of pyridine, based on the pyran fed, was 45 percent.

EXAMPLE 6

The reaction mixture consisted of:

| | |
|---|---|
| cupric acetate | $3.7\times10^{-2}$ moles |
| ammonium acetate | $23\times10^{-2}$ moles |
| dimethylacetamide | 100 ml. |
| water | 100 ml. |

Over a period of 3 hours, $3.2\times10^{-2}$ moles of glutaraldehyde (in 15 ml. water) were added to the mixture while oxygen was introduced continuously, as described in example 1, and the reaction mixture was maintained at 80° C. The initial pH of the mixture was 8.5 and the pH at the end of the reaction was 7.0.

The molar yield of pyridine, based on the glutaraldehyde fed, was 45 percent.

EXAMPLE 7

The reaction mixture consisted of:

| | |
|---|---|
| cupric acetate | $3.75\times10^{-2}$ moles |
| urea | $13\times10^{-2}$ moles |
| glacial acetic acid | $66\times10^{-2}$ moles |
| water | 160 ml. |

Over a period of 3 hours, $5.2\times10^{-2}$ moles of 2-methoxy-3,4-dihydro-2H-pyran were added to the mixture while oxygen was introduced continuously, as described in example 1, and the reaction mixture was maintained at 80° C.

The molar yield of pyridine, based on the pyran fed, was 71 percent.

EXAMPLE 8

The procedure of example 7 was repeated except that the urea was replaced by formamide ($38\times10^{-2}$ moles) and the quantity of 2-methoxy-3,4-dihydro-2H-pyran added was $4.3\times10^{-2}$ moles.

The molar yield of pyridine, based on the pyran fed, was 80 percent.

We claim:

1. In a process for preparing a pyridine which comprises reacting a compound selected from the group consisting of glutaraldehyde, alkyl glutaraldehydes and 2-alkoxy-3,4-dihydro-2H-pyrans having up to 6 carbon atoms in the alkoxy group in the liquid phase with ammonium ion, the improvement which comprises carrying out said reaction in the presence of molecular oxygen and cupric ions and in a reaction medium comprising an alkanoic acid containing up to six carbon atoms in the alkyl group.

2. The process of claim 1 wherein the pH of the reaction mixture is in the range from 1 to 7.

3. The process of claim 2 wherein said medium is aqueous acetic acid.

4. The process of claim 1 wherein the concentration of cupric ions lies in the range of $10^{-3}$ molar to 1.0 molar.

5. The process of claim 1 wherein the concentration of ammonium ions in the reaction mixture is in the range of 0.01 molar to 2 molar.

6. The process of claim 1 wherein cupric acetate is used to provide cupric ions and ammonium acetate is used to provide ammonium ions.

7. The process of claim 1 wherein glutaraldehyde itself is used as starting material.

8. The process of claim 1 wherein the reaction is carried out at a temperature in the range 15° to 150° C.

9. The process of claim 1 wherein the reaction is carried out at a temperature in the range 80° to 130° C. and a pressure in the range 1 to 20 atmospheres.

10. The process of claim 1 wherein the partial pressure of oxygen is at least 0.5 atmosphere.

* * * * *